United States Patent [19]

Mar et al.

[11] Patent Number: 4,527,390
[45] Date of Patent: Jul. 9, 1985

[54] LOW LOSS DUCT BURNER

[75] Inventors: Henry M. Mar; Samuel B. Reider, both of Indianapolis, Ind.

[73] Assignee: General Motors Corporation, Detroit, Mich.

[21] Appl. No.: 845,424

[22] Filed: Oct. 25, 1977

[51] Int. Cl.³ .............................................. F02K 3/06
[52] U.S. Cl. ...................................... 60/224; 60/261
[58] Field of Search ....................... 60/224, 261, 262

[56] References Cited

U.S. PATENT DOCUMENTS

| | | | |
|---|---|---|---|
| 2,847,821 | 8/1958 | Brown | 60/261 |
| 2,899,799 | 8/1959 | Setterblade | 60/39.72 |
| 3,245,218 | 4/1966 | Marchant | 60/224 |
| 3,528,250 | 9/1970 | Johnson | 60/261 |
| 3,693,354 | 9/1972 | Hull | 60/261 |

*Primary Examiner*—Stephen C. Bentley
*Attorney, Agent, or Firm*—Saul Schwartz

[57] ABSTRACT

A jet propulsion engine with a fan bypass duct includes a duct burner with a plurality of flame stabilizers therein each mounted to inner case and outer case members through spherical bearings. Each of the stabilizers consists of two blade members having integral arms thereon actuated by fore and aft motion of an external actuating ring to assume an expanded position to increase duct turbulence for mixing air flow therethrough with a fuel supply and into a retracted position against each other to reduce pressure drop under nonafterburning operation. Each of the flame stabilizer blades has a platform that controls communication between a hot air source and a duct for improving fuel vaporization during afterburner operation thereby to increase afterburning limits; the platforms close communication between the hot air source and the duct during nonafterburning operation when flame stabilization is not required.

2 Claims, 3 Drawing Figures

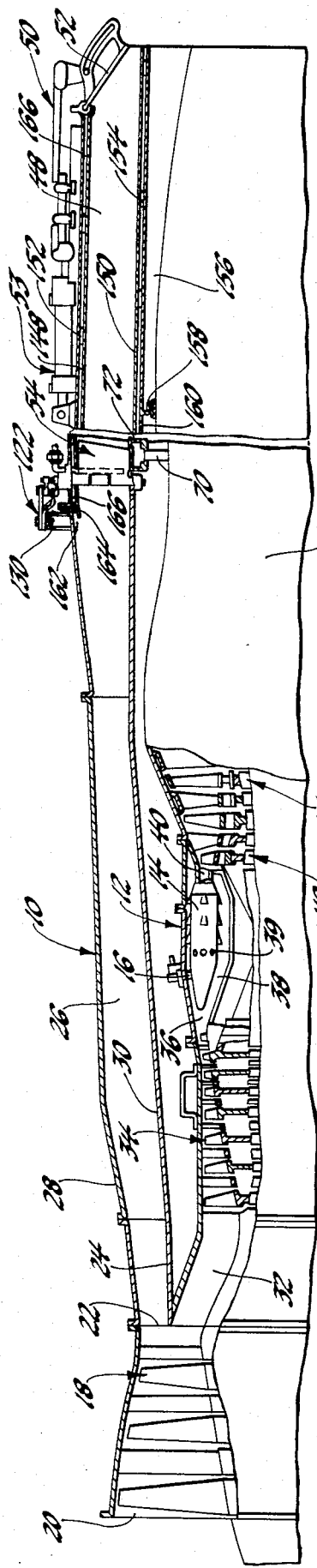

LOW LOSS DUCT BURNER

The invention herein described was made in the course of work under a contract or subcontract thereunder with the Department of Defense.

This invention relates to afterburner assemblies for association with jet propulsion engines and more particularly to afterburner assemblies for association with jet propulsion engines having a fan bypass in association therewith.

Various variable geometry afterburner constructions have been proposed. For example, in U.S. Pat. No. 2,899,799, issued Aug. 18, 1959, to Setterblade, a flame stabilizer is disclosed having movable vanes that include an expanded position for flame stabilization during afterburner operation and a retracted position to minimize pressure drop through the afterburner during nonafterburner operation.

It is further recognized that in fan bypass type jet propulsion engines a plurality of multiple annular flameholder gutters can be located downstream of a chamber in which cold air from the bypass and hot gas flow from the core engine are mixed to promote stabilized combustion over a wide range of engine operating conditions.

Still a further approach to afterburner design for jet propulsion engines having a fan bypass is set forth in U.S. Pat. No. 3,528,250 issued Sept. 15, 1970, to D. Johnson. In this arrangement a flameholder is located in both the hot and cold airstream and optimized to produce stable afterburner operation in both hot and cold streams that are separately directed therethrough. The disadvantage in such unmixed systems is that cold stream combustion requires a relatively bulky fuel injection and combustor arrangement which can produce undesirable pressure drop in the cold air duct.

An object of the present invention is to improve afterburner operation in a fan duct type jet propulsion engine by the provision therein of variable geometry flame stabilizers and to do so by associating such flame stabilizers with a hot gas source selectively directed into the cold air stream of a fan bypass duct in response to stabilizers being located in an expanded, flow interference and flame stabilization position within the cold air duct so as to thoroughly mix hot gas, cold air and fuel during afterburner operation.

Still another object of the present invention is to provide an improved afterburner configuration for use in a jet propulsion engine of the fan bypass type having a cold air duct therein located in surrounding relationship to a core engine having hot exhaust gas flow therefrom and wherein a hot gas crossover duct is connected between the core engine and the cold air stream and wherein variable geometry flame stabilizers are located only in the cold air stream and include means thereon to open the hot gas crossover duct for flow of hot gas into the fan bypass exhaust stream for turbulent mixture with cold air passage therethrough so as to enhance combustion of fuel directed into the cold air bypass fan discharge flow path when the stabilizers are in an expanded flame stabilization position.

Yet another object of the present invention is to provide an improved flameholder configuration for use in a cold air duct in a fan bypass gas turbine engine by the provision of a plurality of flame stabilizers located at circumferentially located points within an annular cold air fan bypass duct wherein each of the stabilizers includes a pair of stabilizer blades operable between expanded and retracted positions and wherein a hot gas crossover duct communicates a hot gas source in a core engine with the cold air fan bypass duct and wherein each of the blades further includes means thereon for opening the hot air gas crossover duct when the pair of blades are in an expanded flame stabilization position and operable to close the hot air crossover duct when the stabilizers are located in a retracted position to reduce pressure drop through the cold air duct; the expanded blades, crossover duct controlling means thereon serving to produce thorough mixing of cold air and fuel directed therein during afterburner operation so as to promote and stabilize afterburner combustion over a wide range of engine operation.

Further objects and advantages of the present invention will be apparent from the following description, reference being had to the accompanying drawings wherein a preferred embodiment of the present invention is clearly shown.

FIG. 1 is a longitudinal cross-sectional view of a fan bypass, jet propulsion engine including low pressure loss duct afterburner apparatus in accordance with the present invention;

FIG. 2 is a fragmentary enlarged vertical sectional view of a flame stabilizer component within the engine of FIG. 1; and FIG. 3 is a horizontal sectional view taken along the line 3—3 of FIG. 2 looking in the direction of the arrows.

Referring now to FIG. 1, a turbofan jet aircraft propulsion engine 10 is illustrated including a core engine 12 having a combustor 14 with a fuel supply 16 thereto. Compressed air is directed to the core engine 12 from an upstream, low pressure fan 18 having an inlet 20 and an outlet 22 upstream of a flow divider 24 that directs part of the low pressure fan stage air into an annular, cold air bypass duct 26 defined between an outer case 28 and the outer liner 30 of the core engine 12. The remainder of the discharge air from the low pressure fan 18 is directed through an annular passage 32 into the inlet of a high pressure compressor 34 having an outlet 36 therefrom in communication with a diffuser chamber 38 to supply air through liner air inlet openings 39 within the combustor 14.

Hot gas from the combustor 14 is discharged through an outlet 40 across a high pressure turbine 42 and a downstream low pressure turbine 44 connected by suitable shaft means (not shown) to the high pressure compressor 34 and the low pressure fan 18, respectively. Exhaust from the core engine 12 is directed downstream therefrom through a core engine exhaust assembly 46 located radially inboard of an annular exhaust passage 48 from the bypass duct 26. The exhaust passage 48 is controlled by a variable area exhaust nozzle 50 with a plurality of circumferentially located plates 52 thereon preferably constructed of a core of porous laminated material such as disclosed in U.S. Pat. No. 3,584,972, issued June 15, 1971, to Bratkovich et al. The plates 52 are positioned by a hydraulic actuator system 53.

An improved duct burner assembly 54 is located between the inlet portion of the duct 26 and the bypass duct exhaust passage 48.

The improved duct burner assembly 54 includes a plurality of flame stabilizer units 56 located at circumferentially spaced points around the duct 26 upstream of the exhaust passage 48. Each of the stabilizer units 56 is associated with a pilot fuel spray bar 58 and a laterally spaced main fuel spray bar 60 which is in the configuration of an ovate tube having a valve member 62 incorporating a stem 64 that extends across the major diameter of the main fuel spray bar where it is secured to the ID of the wall.

The spray bar 60 is a thin walled member and is responsive to fuel pressure whereby as pressure increases within the bar it becomes more circular from an unstressed ovate configuration thereby to shorten the major diameter and to move the valve 62 into an open position with respect to an outlet opening 66 from whence fuel is directed into the bypass duct 26 at a point between each of the flame stabilizer units 56.

The pilot fuel spray bars 58 include orifices 68 therein for directing a regulated amount of fuel into the duct burner so as to maintain a starting flame therein.

Each of the flame stabilizer units 56 is associated with a hot gas crossover duct 70 directing hot gas from the core engine 12 into a plenum 72 having an inlet 74 thereto connected to the crossover tube 70 and including a wall 76 thereon defining part of the inner wall of the duct 26 at the flame stabilizer unit 56. The wall 76 includes an array of triangularly located circular openings 78, 80, 82 through which hot gas can flow into the duct 26.

Each stabilizer unit 56 further includes a pair of blades 84, 86, each having a hinged end 88, 90, respectively. Hinged end 88 is connected to a hinge pin 92 directed vertically of the duct 26. The hinged end 90 has an upper end portion 94 thereon and a lower end portion 96 thereon supportingly received within bores 97, 98 formed in spherical bearing elements 100, 102, respectively. Each of the spherical bearing elements 100, 102 are in turn supportingly received within bearing socket members 104, 106. The socket member 104 is retained in place by means of a snap ring 108. The spherical bearing element 102 is held in place by means of a bushing 110 which is secured by means of a retainer ring 112 within an open end 114 of the socket member 106. The hinge pin 92 is rotatably supported within a bore 115 in element 102 at one end thereof and is connected by splines 116 at the opposite end thereof to a lever 118. A pivot pin 120 connects lever 118 to a V-configured actuator 122 having first and second links 124, 126 with free ends thereon connected by means of a pivot pin 128 to an axially movable externally located, actuator ring 130 which is spaced from case 28 in surrounding relationship therewith.

Opposite ends of the links 124, 126 are connected by pivot pin 120 and a pivot pin 132 to distal ends of the lever 118 and a lever 134 that is connected to an externally splined end 136 on the outboard extension of the hinged end 90 on the blade 86. Fore and aft movement of the control ring 130 with respect to case 28 will produce movement of the blades 84, 86 between a retracted position 138 shown by dotted lines in FIG. 3 and into an expanded position shown in solid lines in FIG. 3.

During normal engine operation, the control ring is positioned to locate the blades 84, 86 together and as a consequence the flow area through the annular duct 26 is maintained relatively open, the area of the blades constituting only approximately 10% of the total flow area through the annulus. Consequently, the pressure loss through the duct 26 during non-afterburning operation is reduced. During non-afterburning the fuel flow from the pilot bar 58 is controlled to produce a pilot flame within the duct 26 that serves to ignite main afterburner fuel flow through the bar 60 under conditions when afterburner operation is selected.

In accordance with certain principles of the present invention the blades 84, 86 each include base platforms 140, 142, respectively, each having a generally triangularly configured planar extent. The platforms 140, 142 are movable into and out of overlying relationship with the openings 78, 80, 82 so that when the flame stabilizer units 56 are in their retracted position ( dotted line as shown in FIG. 3) the platforms 140, 142 close the openings 78, 80, 82 to prevent passage of hot air from the plenum 72 into the cold air passing through the bypass duct 26. The minimal heat input from the pilot flame is insufficient to materially affect the bypass flow during normal engine operating mode.

During afterburning operation, the actuator or control ring 130 is moved to the right as shown in FIG. 3 to cause the blades 84, 86 to be expanded. At the same time the platforms 140, 142 are moved out of overlying relationship with the openings 78, 80, 82. In this position the blades 84, 86 block approximately 60% of the total flow area through the duct 26 and produce a recirculating flow in the vicinity of the trailing edges 144, 146 of the blades 84, 86, respectively, in a direction upstream thereof. The recirculation draws hot air from the openings 78, 80, 82 and thereby produces a resultant increased temperature gas mixture in the vicinity of the main fuel spray bars 60 from whence fuel is directed in substantial quantities during the afterburner operation. The heat gas and fuel are ignited from the pilot flames generated by the pilot fuel spray bar 58 thereby to produce duct burning of fuel, air and recirculating hot exhaust. The jets of hot gas into the duct 26 from the openings 78, 80, 82 along with the recirculation path serve to promote and stabilize duct burning combustion over a wide range of engine operating conditions and variable area exhaust nozzle 50 affords further thrust control during afterburn.

Another feature of the invention is porous, laminated metal air cooled outer wall liners 148 and inner wall liners 150 are located at points downstream of the duct burner assembly 54. The porous material is as set forth in the aforesaid Bratkovich et al patent. Each of the inner and outer wall liners 148, 150 are supported by convoluted spring strips 152, 154, respectively, with respect to the outer case 28 and the core engine outer liner 30 thereby to accommodate thermal expansion during operation of the duct burner assembly 54. Liners 148, 150 also shield the outer case 28 and liner 30 from the hot exhaust gases in the duct 26 during the afterburner phase of operation. The liners 148, 150 are supplied by compressor bleed air that is directed into a chamber 156 sealed in part by means of the center support seal assembly 158. Thus, coolant air flow is directed through openings 160 in the inner wall 30 thence through the porous laminated layers of the wall liner 150.

The outer laminated porous metal wall liner 158 extends upstream of the burner assembly 54 to scoop cooling air from a diffuser 162 leading to an annular inlet 164 to a coolant space 166 between the outer case 28 and the wall liner 148 to cause relatively cool air to flow through the liner 148. Cool air flow through both the wall liners 148, 150 thereby protects the exhaust duct downstream of the burner assembly from hot gases produced therein during afterburner phases of operation.

The aforesaid arrangement for an improved duct burner in a fan bypass type turbojet engine is unusually compact and combines improved recirculation within the duct 26 for mixing cold air with hot air. The hot air is under the control of valve means constituted by platforms formed as part of the flame stabilizer blades of the assembly. The system is especially suited for use with downstream located, transpiration cooled, porous metal liners and is readily adaptable for improving the combustion of afterburner fuel through fuel spray bar components such as that shown at 60 in FIG. 3.

When the stabilizer blades are closed the engine is operated at low pressure loss and the hot gas is isolated from the bypass during non-afterburner fan bypass engine cycles of operation. Blades 84, 86 are each guided by a pair of pins 170, 172 thereon slidably received in axially spaced slots 174, 176 in liner 30.

While the embodiments of the present invention, as herein disclosed, constitute a preferred form, it is to be understood that other forms might be adopted.

The embodiments of the invention in which an exclusive property or privilege is claimed are defined as follows:

1. A duct burner assembly for use with a fan bypass turbojet engine having a fan discharge duct therein in communication with a flow diffuser passage for expanding fan discharge air comprising: an afterburner inlet, a plurality of movable flame stabilizers located within said afterburner inlet and operative to maintain a stabilized flame front at said afterburner inlet, each of said stabilizers including a pair of blades extending through the vertical extent of said afterburner inlet, actuator means for positioning said blades in a retracted position against one another to reduce flow interference through said afterburner inlet, said actuator means being operable to locate said blades in an expanded position to restrict cold air flow through said afterburner inlet during afterburner operation, means for directing fuel into the afterburner inlet during afterburner operation, a hot gas supply having ports in communication with the afterburner inlet, each of said blades including flow controller means thereon to block passage of hot gas into the afterburner inlet when the blades are in their retracted position, said flow controller means being operable when said blades are in their expanded position to direct hot air into the afterburner inlet for mixture with cold bypass air flow therethrough during afterburner operation so as to widen the stability of combustion of air and fuel within the afterburner during afterburner operation.

2. A duct burner assembly for use with a fan bypass turbojet engine having a fan discharge duct therein in communication with a flow diffuser passage for expanding fan discharge air comprising: an afterburner inlet, a plurality of movable flame stabilizers located within said afterburner inlet and operative to maintain a stabilized flame front at said afterburner inlet, each of said stabilizers including a pair of hinged blades extending through the vertical extent of said afterburner inlet actuator means for positioning said hinged blades in a retracted position against one another to reduce interference with flow through said afterburner inlet, said actuator means being operable to locate said blades in an expanded position to restrict cold air flow through said afterburner inlet during afterburner operation, means for directing fuel into the afterburner inlet during afterburner operation, a hot air supply having ports in communication with the afterburner inlet, each of said blades including a base platform thereon located in overlying relationship with said ports to block passage of hot air into the afterburner inlet when the blades are in their retracted position, said base platforms being positioned by each of said blades to one side of said ports when said blades are in their expanded position to direct hot air into the afterburner inlet for mixture with cold bypass air flow thereto during afterburner operation so as to widen the stability of combustion of air and fuel within the afterburner during afterburner operation.

* * * * *